Feb. 19, 1952  G. W. PETERMAN  2,586,435
LATCH FOR THROTTLE CONTROL PEDALS
Filed May 22, 1950
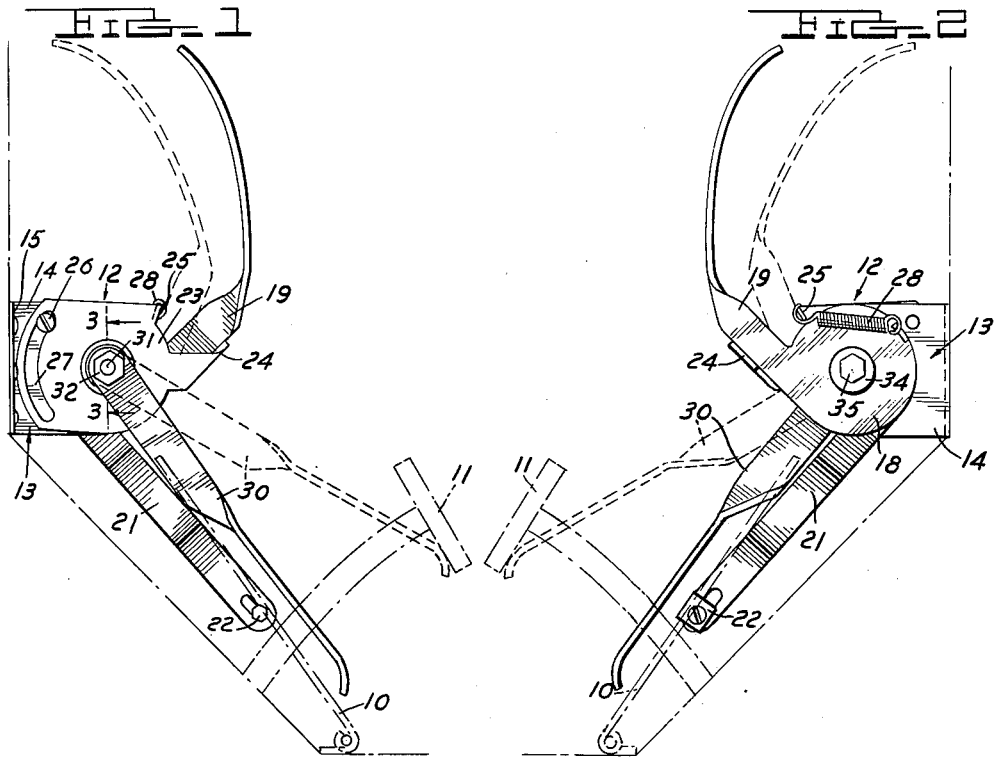
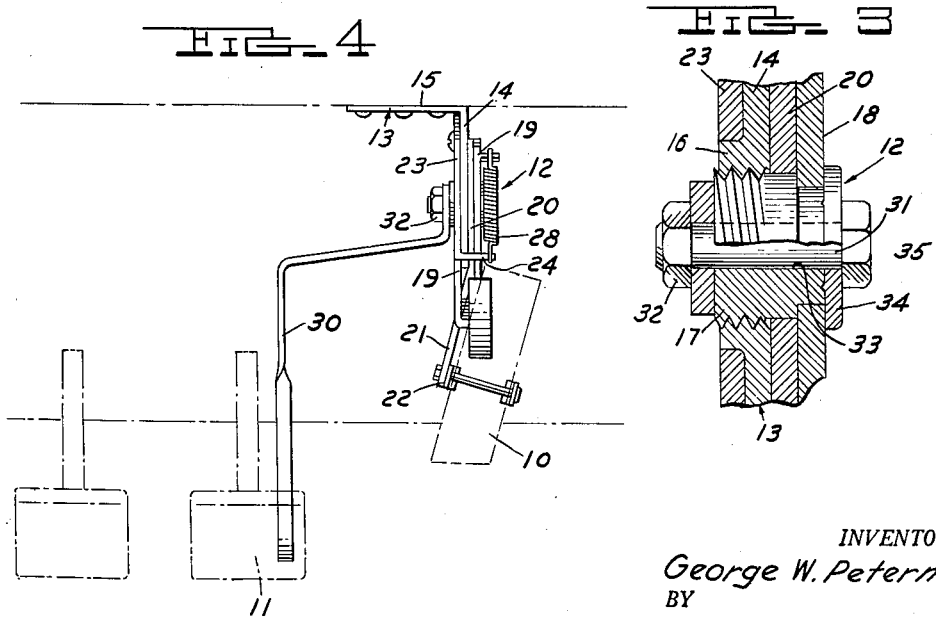
INVENTOR.
George W. Peterman
BY
ATTORNEYS Patented Feb. 19, 1952

2,586,435

UNITED STATES PATENT OFFICE 2,586,435

LATCH FOR THROTTLE CONTROL PEDALS

George W. Peterman, Milford, Mich.

Application May 22, 1950, Serial No. 163,414

9 Claims. (Cl. 192—3)

It is an object of this invention to provide a releasable latch assembly capable of being readily attached as an accessory to a part of a vehicle in a position to be conveniently operated by one foot of the operator and having means for holding the usual accelerator pedal in any desired position.

It is another object of this invention to provide a latch of the above type which is releasable either by depressing the brake operating pedal or the accelerator pedal.

The foregoing as well as other objects will be made more apparent as this description proceeds, especially when considered in connection with the accompanying drawing, wherein:

Figure 1 is an elevational view of one side of an accelerator latch assembly embodying the features of this invention;

Figure 2 is an elevational view of the opposite side of the assembly shown in Figure 1;

Figure 3 is a sectional view taken on the line 3—3 of Figure 1; and

Figure 4 is a plan view of the latch assembly shown in Figure 1.

In the drawing the numeral 10 designates an accelerator pedal pivoted at its lower end to a part of the flooring in the driver's compartment of a vehicle body and operatively connected in the usual manner to the throttle (not shown) of the engine for the vehicle. The arrangement is such that movement of the accelerator downwardly toward the flooring opens the throttle and upward movement of the accelerator pedal 10 closes the throttle. Supported adjacent the accelerator 10 is a brake operating pedal 11 which also functions in accordance with orthodox practice to apply the brake (not shown) when moved downwardly toward the vehicle body flooring and to release the brake when returned to its normal or uppermost position.

In accordance with this invention a latch assembly 12 is provided for holding the accelerator pedal 10 in any desired adjusted position. The latch assembly 12 includes a bracket 13 having a plate 14 and having a flange 15 at one edge of the plate attachable to any convenient part of the vehicle body adjacent to the accelerator. The plate 14 is fashioned with a hub portion 16 having a central opening therethrough internally threaded for threadably receiving a rotatable screw 17.

Staked or otherwise secured to the screw adjacent one end is a disc 18 having an arm 19 curved upwardly from the periphery of the disc in the manner shown in Figures 1 and 2 of the drawing to assume a position for convenient engagement by one foot of the operator. Journalled on the screw 17 between the disc 18 and the plate 14 is a second disc 20 having an arm 21 extending beneath the swinging end of the accelerator pedal 10 and removably secured to the pedal intermediate the ends of the latter by a suitable clamp 22 which is adjustable to accommodate accelerator pedals of varying widths.

As shown in Figure 3 of the drawing, the hub 16 extends in a direction axially of the screw 17 from the side of the plate 14 opposite the side at which the disc 20 is positioned and a third disc 23 is journalled on the hub for rotation about the axis of the screw 17. A pair of circumferentially spaced stops in the form of lugs 24 and 25 extend from the periphery of the disc 23 in a direction toward the arm 19. These lugs or stops are respectively positioned at opposite sides of the arm 19 and serve to limit the angular travel of the arm 19 about the axis of the screw 17.

The disc 23 is secured to the plate 14 by a screw 26 threaded in a tapped hole formed in the plate 14 and extending through a slot 27 in the disc 23. The slot 27 is arcuate and is concentric with the axis of rotation of the disc 23. With this construction the disc 23 may be readily angularly adjusted to vary the position of the stops or lugs with respect to the arm 19. The purpose of this adjustment will be apparent upon considering the operation of the latch assembly to be presently described.

Under normal conditions of operation, the latch is in its released position shown in Figures 1 and 2 of the drawing. When in this position the disc 20 is free on the screw 17 and the arm 21 moves as a unit with the accelerator 10 without interference from any part of the latch assembly. In the event the operator desires to release his foot from the accelerator pedal 10 without closing the throttle connected to the accelerator, it is only necessary to push the arm 19 upwardly, and this may be readily accomplished by engaging the arm 19 with either foot while maintaining the accelerator at its desired adjusted position.

The threads on the screw 17 and bracket 13 extend in a right hand direction, so that upward movement of the arm 19 rotates the screw 17 into the hub 16, and wedges the disc 20 against the adjacent side of the plate 14. The arm 19 is swung upwardly until it strikes the stop 25, and the disc 23 is angularly adjusted to assure the required angular movement of the screw 17 to clamp the disc 20 against the plate 14 before the arm 19 strikes the stop 25.

The accelerator pedal 10 is frictionally held in its selected applied position until the screw 17 is rotated in the opposite direction to release the same. One way that this may be readily accomplished is by depressing the accelerator pedal 10. Downward movement of the accelerator pedal 10 applies a force on the arm 21 in a corresponding direction, and this force is transferred to the disc 18. Accordingly the screw 17 is rotated in a direction to loosen the same; and the disc 20, as well as the arm 21, is released from frictional engagement with the plate 14. Movement of the disc 18 in a direction to loosen the screw 17 is facilitated by a spring 28 having one end connected to the lug or stop 25 and having the other end connected to the disc 18 adjacent the periphery of the latter as shown in Figure 2 of the drawing. The strength of the spring 28, while sufficient to assist release of the latch, is not sufficient to overcome the frictional engagement between the disc 20 and plate 14 without first depressing the arm 21 or accelerator pedal.

The latch assembly may be released independently of the accelerator pedal 10 by depressing the brake pedal 11. In detail an arm 30 is clamped at one end to the end of the screw 17 adjacent the disc 23 by a bolt 31 and nut 32. The bolt extends axially through a bore 33 in the screw 17, and a washer 34 is seated on the bolt between the head 35 on the bolt and the adjacent side of the disc 18. The threaded end of the bolt 31 extends through an opening in the arm 30 and is engaged by the nut 32. The nut 32 effectively clamps the arm 30 to the screw 17 so that rotation of the arm in a downward direction as shown in Figures 1, 2 and 4 of the drawing rotates the screw 17 in a direction to loosen the same. Thus the disc 20 and arm 21 are released, and the accelerator may be operated in an orthodox manner to control the throttle.

Downward movement of the arm 30 to release the arm 21 or accelerator is accomplished by depressing the brake pedal 11. As shown in Figures 1, 2 or 4 the free end of the arm 30 extends rearwardly from the latch assembly to a position directly beneath the brake operating pedal, so that initial downward movement of the brake operating pedal immediately releases the accelerator 10.

It will be noted that the latch assembly described above is composed of relatively few simple parts capable of being inexpensively manufactured, assembled and installed as a unit on a vehicle without interfering with or changing any of the parts thereof.

What I claim as my invention is:

1. In combination with an engine throttle control member mounted on a support for movement in one direction to open the throttle and for movement in the opposite direction for closing the throttle, a releasable latch for holding the control member in different positions of adjustment, said latch having a bracket attachable to the support and having an internally threaded opening in the bracket, a part extending axially through the opening and threadably engaging the bracket, a first arm journalled on the part adjacent one side of the bracket and connected to the control member, and a second arm rotatable as a unit with said part and supported adjacent the first arm in a position to clamp the first arm against the bracket upon rotation of the part by the second arm in a direction opposite the direction of movement of the control to open the throttle.

2. The construction set forth in claim 1 in which the first arm is operated by the control member and in which a thrust applied to the first arm in the direction of movement of the control member to open the throttle imparts rotation to the second arm and threaded part in a corresponding direction when the first arm is in its clamped position to release the first arm and permit unobstructed movement of the control member in both directions.

3. The construction set forth in claim 2 having spring means assisting rotation of the second arm and part in a direction to release the first arm from its clamped position.

4. The construction set forth in claim 2 having means other than the first arm for rotating the threaded part in a direction to release the first arm from its clamped position.

5. The construction set forth in claim 2 having stops at opposite sides of the second arm for limiting the extent of rotation of the second arm in opposite directions to its latching and released positions, and spring means normally urging the second arm to its released position.

6. The construction set forth in claim 5 in which the stops are adjustable about the axis of rotation of the second arm to vary the positions of the stops relative to the second arm.

7. In combination with a brake control member and an engine throttle control member mounted on a support for movement in opposite directions, a releasable latch for holding the throttle control member in different positions of adjustment, said latch having a bracket attachable to the support and having an internally threaded opening, a rotatable part extending through the opening and threadably engaging the bracket, a first arm journalled on the part adjacent one side of the bracket and connected to the throttle control member, a second arm rotatable as a unit with said part and supported adjacent the first arm in a position to frictionally clamp the first arm against the bracket upon rotation of the threaded part by the second arm in a direction opposite the direction of movement of the throttle control member to open the throttle, the connection between the throttle control member and first arm being responsive to movement of the throttle control member in a direction to open the throttle for operating the first arm to release the latter from clamping engagement with the bracket, and means operated by the brake control member for releasing the first arm from its clamped position independently of the throttle control member.

8. The construction set forth in claim 7 wherein the means for releasing the first arm comprises a third arm also rotatable as a unit with the threaded part and having one end positioned beneath the brake control member for operation by the latter to release the first arm independently of the second arm.

9. The construction set forth in claim 8 having spring means for assisting movement of the second and third arms to their released positions.

GEORGE W. PETERMAN.

REFERENCES CITED

The following references are of record in the file of this patent:

UNITED STATES PATENTS

| Number | Name | Date |
|---|---|---|
| 638,925 | Hansler | Dec. 12, 1899 |
| 1,320,561 | Mahr | Nov. 4, 1919 |
| 1,710,091 | Grimm | Apr. 23, 1929 |
| 2,270,002 | Glick | Jan. 23, 1942 |
| 2,274,288 | Arens | Feb. 24, 1942 |